(12) United States Patent
Iwamoto et al.

(10) Patent No.: US 12,473,145 B2
(45) Date of Patent: Nov. 18, 2025

(54) DELIVERY RACK AND DELIVERY VEHICLE

(71) Applicant: TOYOTA JIDOSHA KABUSHIKI KAISHA, Toyota (JP)

(72) Inventors: Kunihiro Iwamoto, Nagakute (JP); Yuta Itozawa, Nagoya (JP); Hirotaka Komura, Tokyo (JP); Yutaro Takagi, Tokyo (JP); Yoshiaki Nakamoto, Nisshin (JP); Junya Ota, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 995 days.

(21) Appl. No.: 17/564,917

(22) Filed: Dec. 29, 2021

(65) Prior Publication Data

US 2022/0250837 A1  Aug. 11, 2022

(30) Foreign Application Priority Data

Feb. 8, 2021  (JP) .................. 2021-018487

(51) Int. Cl.
*B65G 1/00* (2006.01)
*B65D 50/06* (2006.01)
(Continued)

(52) U.S. Cl.
CPC ......... *B65G 1/0492* (2013.01); *B65D 50/067* (2013.01); *B65G 1/0478* (2013.01);
(Continued)

(58) Field of Classification Search
CPC . E05B 81/04; B65D 2255/20; B65D 2211/00; B65D 50/067; B65G 2209/06;
(Continued)

(56) References Cited

U.S. PATENT DOCUMENTS 606,556 A * 6/1898 Keith .................... E05B 65/462
52/234
3,976,343 A * 8/1976 Breckner .............. E05B 65/462
312/219
(Continued)

FOREIGN PATENT DOCUMENTS

JP  2003-135169 A  5/2003
JP  2006-037544 A  2/2006
(Continued)

*Primary Examiner* — Steven O Douglas
(74) *Attorney, Agent, or Firm* — Oliff PLC

(57) ABSTRACT

A rack includes: a casing; M pairs of supports that are provided inside the casing so as to extend in a depth direction and arrayed at regular intervals in an up-down direction; and a lock mechanism that locks returnable containers each housed while being supported so as to be slidable along one pair of supports. The casing of the rack is divided into N rows by (N−1) partition plates, with the M pairs of supports provided in each row, to be able to house a maximum of (M×N) returnable containers. The lock mechanism is provided in each of the (N−1) partition plates so as to extend through the partition plate and correspond to each tier, and simultaneously locks two returnable containers that are housed adjacent to each other on one side and the other side of the partition plate.

5 Claims, 8 Drawing Sheets

(51) Int. Cl.
    *B65G 1/04*           (2006.01)
    *B65G 1/06*           (2006.01)
    *B65G 1/137*         (2006.01)
    *E05B 81/04*        (2014.01)

(52) U.S. Cl.
    CPC .......... *B65G 1/0485* (2013.01); *B65G 1/065* (2013.01); *B65G 1/137* (2013.01); *E05B 81/04* (2013.01); *B65D 2211/00* (2013.01); *B65D 2255/20* (2013.01); *B65G 2209/06* (2013.01)

(58) Field of Classification Search
    CPC ...... B65G 1/137; B65G 1/065; B65G 1/0485; B65G 1/0478; B65G 1/0492
    USPC .......................................................... 410/31
    See application file for complete search history.

(56) References Cited

U.S. PATENT DOCUMENTS

| | | | |
|---|---|---|---|
| 11,130,511 B2* | 9/2021 | Abohammdan | B62B 3/005 |
| 11,554,706 B2* | 1/2023 | Radetzki | B62B 3/005 |
| 2017/0340105 A1* | 11/2017 | Knighton | B62B 3/005 |

FOREIGN PATENT DOCUMENTS

| | | |
|---|---|---|
| JP | 2017-145117 A | 8/2017 |
| KR | 10-1378082 B1 | 3/2014 |

\* cited by examiner

FIG. 2
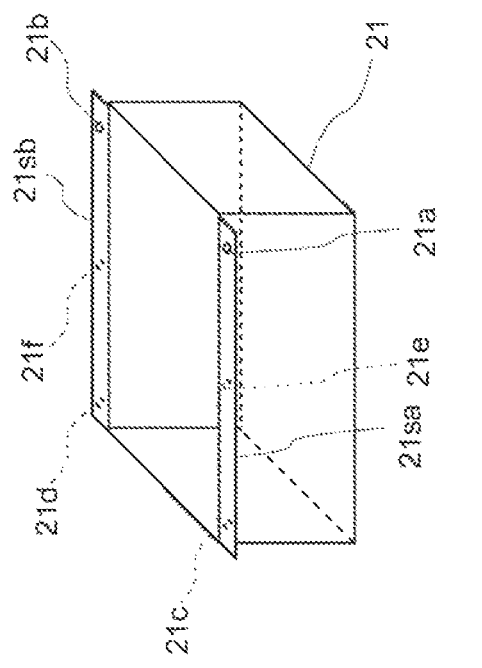
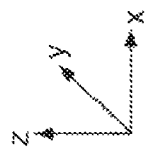

DELIVERY RACK AND DELIVERY VEHICLE

CROSS-REFERENCE TO RELATED APPLICATION

This application claims priority to Japanese Patent Application No. 2021-018487 filed on Feb. 8, 2021, incorporated herein by reference in its entirety.

BACKGROUND

1. Technical Field

This disclosure relates to a delivery rack and a delivery vehicle.

2. Description of Related Art

Delivery of articles is desired to be automated and streamlined. The technique of delivering articles by housing them in returnable containers (also called returnable boxes) is widely known. Japanese Unexamined Patent Application Publication No. 2017-145117 (JP 2017-145117 A) discloses an article carrying apparatus in which a lock mechanism is disposed at a front-side end of an article housed in a housing part.

SUMMARY

The present inventors have been developing a delivery rack and a delivery vehicle in which returnable containers of one or more prespecified sizes can be housed while being supported so as to be slidable along respective pairs of supports that are provided inside a casing so as to extend in a depth direction and arrayed at regular intervals in an up-down direction.

In the process, the present inventors have been working on a lock mechanism that can independently lock and unlock the returnable containers housed in the rack. For example, it is conceivable to provide an electric lock, such as a solenoid lock, for each pair of supports, which, however, raises a problem that the manufacturing costs of the delivery rack and the delivery vehicle increase due to a driving source (actuator or the like) provided for each electric lock.

For example, in the article carrying apparatus described in JP 2017-145117 A, the lock mechanism is provided for each article housed in the housing part. If a solenoid lock is provided for each of the housing parts corresponding to the respective articles in this article carrying apparatus, the manufacturing cost increases due to a driving source required for each solenoid lock.

Having been made in view of these circumstances, this disclosure provides a delivery rack and a delivery vehicle in which all returnable containers of one or more prespecified sizes can be housed in the rack, and which allow each returnable container to be independently and easily locked and unlocked while keeping the manufacturing cost down as much as possible.

A delivery rack according to one aspect of this disclosure includes: a casing; M pairs of supports, with M being an integer not less than two, that are provided inside the casing so as to extend in a depth direction and arrayed in M tiers at regular intervals in an up-down direction; and a lock mechanism that locks returnable containers housed while being supported so as to be slidable along the respective M pairs of supports. The delivery rack is able to house all the returnable containers of one or more prespecified sizes. The casing is divided into N rows by (N−1) partition plates, with the M pairs of supports provided in each of the N rows, and the delivery rack is able to house a maximum of (M×N) returnable containers. Each of the N rows is provided with a door that allows the row to be separately opened and closed. The lock mechanism is provided in each of the (N−1) partition plates so as to extend through the partition plate and correspond to each tier, and simultaneously locks two returnable containers that are housed adjacent to each other on one side and the other side of the partition plate.

A delivery vehicle according to one aspect of this disclosure is a delivery vehicle including a rack. The rack has a casing; M pairs of supports, with M being an integer not less than two, that are provided inside the casing so as to extend in a depth direction and arrayed in M tiers at regular intervals in an up-down direction; and a lock mechanism that locks returnable containers housed while being supported so as to be slidable along the respective M pairs of supports. The rack is able to house all the returnable containers of one or more prespecified sizes. The casing is divided into N rows by (N−1) partition plates, with the M pairs of supports provided in each of the N rows, and the rack is able to house a maximum of (M×N) returnable containers. Each of the N rows is provided with a door that allows the row to be separately opened and closed. The lock mechanism is provided in each of the (N−1) partition plates so as to extend through the partition plate and correspond to each tier, and simultaneously locks two returnable containers that are housed adjacent to each other on one side and the other side of the partition plate.

As described above, in one aspect of this disclosure, each of the N rows divided by the (N−1) partition plates is provided with the door that allows the row to be separately opened and closed. A total of {(N−1)×M} lock mechanisms are each provided in one of the (N−1) partition plates so as to extend through the partition plate and correspond to one tier, and each simultaneously lock two returnable containers that are housed adjacent to each other on one side and the other side of the partition plate. Thus, this lock mechanism can reduce the number of parts to be activated by M from that of a lock mechanism in which each of (M×N) pairs of supports is activated, so that the manufacturing cost of the rack can be kept down.

A protrusion that protrudes from the returnable container toward an outer side in a width direction may slide over the supports. The lock mechanism may be a solenoid lock having a U-shaped pin that extends through the partition plate so as to straddle the partition plate. When simultaneously locking two returnable containers that are housed adjacent to each other on one side and the other side of the partition plate, the pin may fit into holes that are provided in the protrusions of the respective two returnable containers. In this configuration, the returnable containers can be locked using the protrusions thereof, and the number of driving sources can be reduced to keep the manufacturing cost down.

The delivery vehicle may be an autonomous vehicle. This configuration can reduce delivery costs.

This disclosure can provide a delivery rack and a delivery vehicle in which all returnable containers of one or more prespecified sizes can be housed in the rack, and which allow each returnable container to be independently and easily locked and unlocked while keeping the manufacturing cost down as much as possible.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a schematic perspective view showing one example of a returnable container housed in the delivery vehicle according to the first embodiment;

DETAILED DESCRIPTION OF EMBODIMENTS

Figure 1:
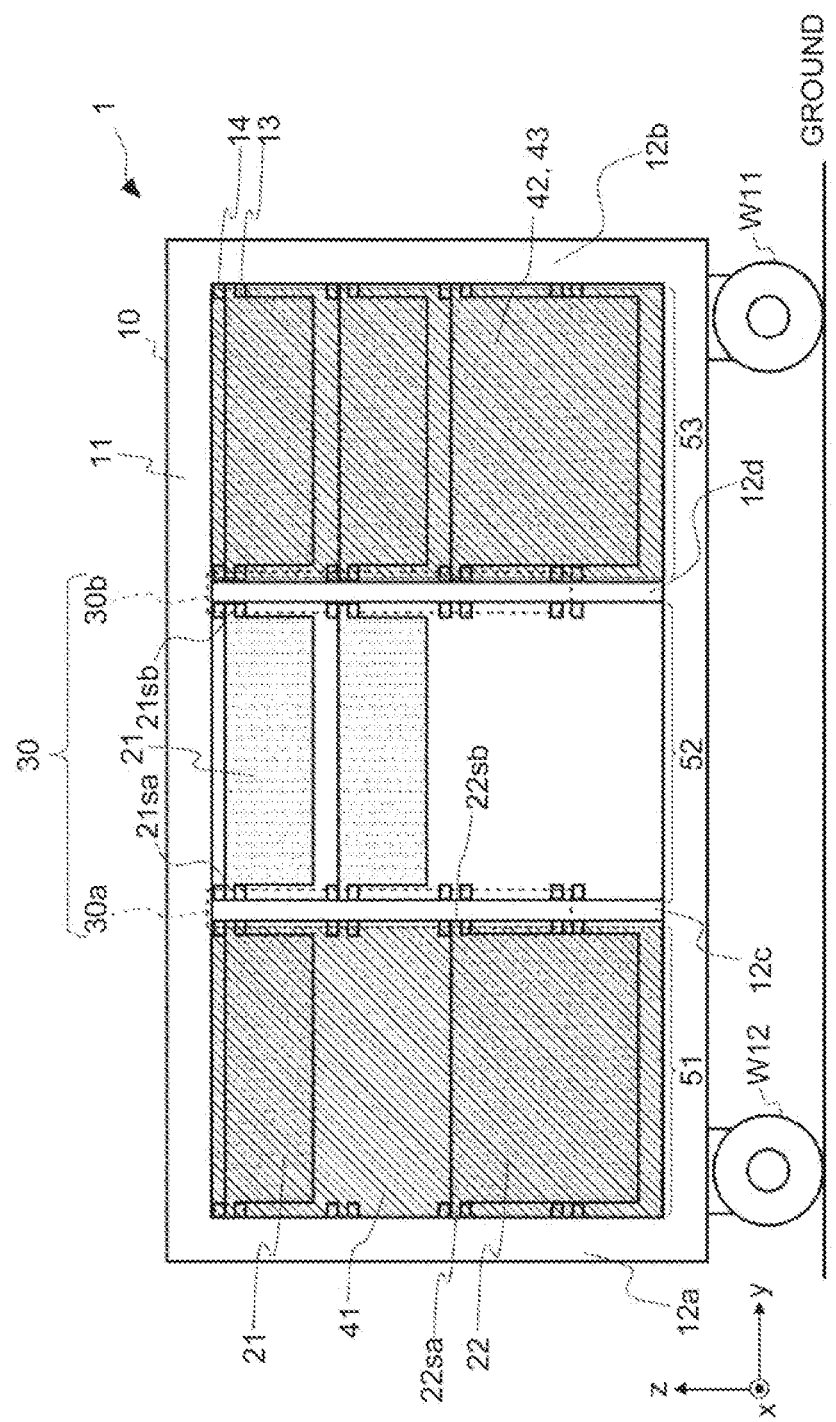
FIG. 1 is a schematic side view showing one example of a delivery vehicle according to a first embodiment.

Specific embodiments will be described in detail below with reference to the drawings. The same or corresponding elements in the drawings are denoted by the same reference signs, and overlapping description will be omitted as necessary to clarify the description.

First Embodiment

FIG. 1 is a schematic side view showing one example of a delivery vehicle according to a first embodiment. The right-handed xyz orthogonal coordinate system shown in FIG. 1 and other drawings is, of course, for the convenience of describing positional relationships among components. Normally, a z-axis positive direction is a vertically upward direction and an xy-plane is a horizontal plane, which applies to all the drawings.

As shown in FIG. 1, a delivery vehicle 1 according to this embodiment is a vehicle that includes a rack 10 and two pairs of wheels W11, W12 and carries articles. The two pairs of wheels W11, W12 are rotatably fixed on a lower side of a casing 11 of the rack 10 and driven by a driving source (not shown), such as a motor. Of course, the number of wheels is not limited to a particular number, and another configuration can also be adopted, such as a configuration in which no wheels are provided and the delivery vehicle 1 is floated and moved using high-pressure air.

Here, the delivery vehicle 1 can include a control unit (not shown) that performs various modes of control relating to the rack 10 etc. These various modes of control can include control of the driving of the wheels W11, W12 in the delivery vehicle 1, and control of the engagement and release of lock (locking and unlocking) by a lock mechanism 30 to be described later. The control unit can include arithmetic units that are each a central processing unit (CPU), for example, and a storage unit, such as a random-access memory (RAM) or a read-only memory (ROM), that stores various control programs, data, etc. Thus, the control unit can function as a computer. The control unit can include an integrated circuit in its configuration.

The delivery vehicle 1 according to the embodiment includes the rack 10 that can house all returnable containers 21, 22, etc. of two or more prespecified sizes. An article to be delivered is delivered by being housed in a returnable container sized to be able to house that article. The returnable containers to be housed, including the returnable containers 21, 22, are not limited to any type of containers; for example, the returnable containers are made of plastic, cardboard, wood, or metal and repeatedly used. While a returnable container itself can constitute an article, normally, an article is delivered in a state of being housed in a returnable container.

The rack 10 provided in the delivery vehicle 1 according to the embodiment is a rack that can house all returnable containers 21, 22, 23 etc. of two or more prespecified sizes. In FIG. 1 that is a side view, the returnable containers 21, 22 are indicated by hatching to help understanding. The same applies to FIG. 6 and FIG. 8 to be described later.

As shown in FIG. 1, the rack 10 includes the casing 11 and M pairs of rails 13 that are provided inside the casing 11 so as to extend in a depth direction (x-axis direction) and arrayed at regular intervals in a height direction (z-axis direction). In the delivery vehicle 1, the casing 11 constitutes a part of a vehicle body. The rails 13 are one example of supports, and here an example where four pairs of rails 13 are provided is described. At a minimum, M (M is an integer not less than two) pairs of supports should be provided inside the casing 11 so as to extend in the depth direction and arrayed in M tiers at regular intervals (hereinafter referred to as "intervals B") in the height direction (up-down direction).

In this embodiment, the returnable containers 21, 22 of two or more prespecified sizes are equal in the width in the y-axis direction and the depth in the x-axis direction. However, the returnable container 21 and the returnable container 22 are different from each other in the height in the z-axis direction. The height of the returnable container 21 having the smallest size is designed according to the interval between the rails 13 that are adjacent to each other in the z-axis direction, i.e., the interval B. Of course, the height of the returnable container 21 is smaller than the interval B between these rails 13. The height of the returnable container 22 is designed to be about twice as large as the height of the returnable container 21. Thus, the heights of the returnable containers of two or more prespecified sizes are designed to be about integral multiples of the interval between the rails 13 that are adjacent to each other in the z-axis direction.

While the returnable containers have two sizes in this example of the configuration shown in FIG. 1, the number of sizes may be three or larger. In the example of FIG. 1, other than the returnable containers 21, 22, for example, a returnable container with a height about three times or about four times that of the returnable container 21 may be separately provided.

The rack 10 further has auxiliary parts 14 that are provided so as to face the rails 13. Here, the rails 13 and the auxiliary parts 14 are provided so as to rise from inner surfaces of the casing 11 and partition plates 12c, 12d in a substantially perpendicular direction.

The M pairs of rails 13 are arrayed in N (N is an integer not less than two) rows in a width direction of the casing 11. That is, the M pairs of rails 13 are provided in each of N rows. Thus, the rack 10 can house a maximum of (M×N) returnable containers. In the example of the configuration shown in FIG. 1, M=4 and N=3.

The rack 10 includes (N−1) partition plates 12c, 12d for separating rows to provide the M pairs of rails 13 in each of the N rows, and the rack 10 is divided into the N rows by these partition plates 12c, 12d. As shown in FIG. 1, the partition plates 12c, 12d are provided parallel to a front plate 12b and a back plate 12a constituting parts of the casing 11

(i.e., parallel to an xz-plane) so as to extend from one side to the other side of the casing 11. Here, the partition plates 12c, 12d are provided such that the interval between each pair of adjacent plates among the front plate 12b, the partition plate 12d, the partition plate 12c, and the back plate 12a of the casing 11 is equal.

Thus, in the rack 10, the M pairs of rails 13 are provided so as to extend in the depth direction (x-axis direction) and arrayed at regular intervals B in the height direction (z-axis direction) in each of the rows defined by the inner surfaces (the front plate 12b and the back plate 12a) of the casing 11 and the partition plates 12c, 12d. In this example of the configuration shown in FIG. 1, therefore, returnable containers of any size can be all housed along the rails 13 if the width thereof is nearly equal to the width of an inside of the casing 11 and the height thereof is nearly an integral multiple of (in this example, one to four times) the interval B in the height direction. As a result, this example of the configuration can streamline the delivery using the returnable containers 21, 22 of two or more prespecified sizes.

Next, housing of the returnable containers using the rails 13 in this example of the configuration will be specifically described. First, the casing 11 has a configuration in which a top plate provided on a positive side in the z-axis direction, a bottom plate provided on a negative side in the z-axis direction, the front plate 12b provided on a positive side in the y-axis direction, and the back plate 12a provided on a negative side in the y-axis direction are integrally formed. Thus, one lateral side or both lateral sides of the casing 11 can be opened to allow the returnable containers 21, 22 to be put in and out.

In this embodiment, as one of the features thereof, doors 41, 42, 43 that allow the rows of the casing 11 to be separately opened and closed are provided in the respective rows, on the lateral side that is open. As mentioned above, one lateral side of the casing 11 may be closed without doors, and such an example will be described in the following.

The doors 41, 42, 43 can be provided to prevent putting in and out of returnable containers in a left row 51, a center row 52, and a right row 53, respectively, and can be slid along rails (not shown) that are provided on an upper side and a lower side of the doors. FIG. 1 shows a state where the center row 52 is opened by moving the door 42 so as to overlap the door 43. While the rails can be arranged such that each of the doors 41 to 43 can be moved only to an adjacent row, the rails for the doors 41 to 43 can also be provided such that each door can be disposed offset in any row.

In the example where the rails 13 are provided in N rows, it is possible to include (N−1) doors, i.e., to provide doors for only two rows when there are three rows as in this example of the configuration. Then, for an open row, putting in and out of returnable containers can be controlled by the lock mechanism 30.

Each pair of rails 13 is provided so as to rise respectively from the front plate 12b of the casing 11 and the partition plate 12d, or respectively from the partition plates 12c, 12d, or respectively from the back plate 12a and the partition plate 12c in a substantially perpendicular direction. Since the rails 13 should be able to at least support the returnable containers 21, 22, the rails 13 may be provided so as to extend discontinuously in the depth direction (x-axis direction). Alternatively, instead of the rails 13, short supports may be disposed so as to line up in the depth direction (x-axis direction). Further, a configuration in which the supports are formed by magnets and partially or entirely attract the returnable containers 21, 22 may be adopted.

The returnable container 21 can be put in and out by opening the door of the row in which the returnable container 21 is to be housed, and sliding protrusions 21sa, 21sb that protrude from the returnable container 21 toward outer sides in the width direction over one pair of rails 13 that are adjacent to and face each other. Here, the protrusions 21sa, 21sb of the returnable container 21 are housed in a state of being placed on the rails 13. To thus house each of the protrusions 21sa, 21sb, the auxiliary part 14 that presses the protrusion 21sa or 21sb so as to be held between the rail 13 and the auxiliary part 14 is provided. The auxiliary part 14 is provided so as to face the rail 13 in the z-axis direction. Each pair of rails 13 and each pair of auxiliary parts 14 corresponding to the respective protrusions 21sa, 21sb are provided, for example, so as to rise from the back plate 12a, the partition plates 12c, 12d, or the front plate 12b in a substantially perpendicular direction. The returnable container 22 having protrusions 22sa, 22sb is put in and out in the same manner by sliding over the rails 13.

Next, the lock mechanism 30 that is one of the main features of this embodiment will be described. In this embodiment, the rack 10 includes the lock mechanism 30 that locks the returnable containers 21, 22 each housed while being supported so as to be slidable along one of the M pairs of rails 13. The lock mechanism 30 included can be broadly divided into, for example, a mechanism 30a in the left row 51 and the center row 52 and a mechanism 30b in the center row 52 and the right row 53. The mechanism 30a and the mechanism 30b can be provided roughly in regions surrounded by the broken lines in FIG. 1.

Before details of the lock mechanism 30 are described, first, an example of the configuration of the returnable container 21 adapted to the lock mechanism 30 will be described with reference to FIG. 2. In terms of delivery operation, it is desirable that the other returnable containers including the returnable container 22 have basically the same shape except for their sizes. FIG. 2 is a schematic perspective view showing one example of a returnable container housed in the rack 10 of the delivery vehicle 1 according to the first embodiment.

As its shape is illustrated in FIG. 2, the returnable container 21 can have the protrusions 21sa, 21sb that allow the returnable container 21 to slide over the rails 13. Thus, the returnable container 21 can be configured such that the protrusions 21sa, 21sb protruding from the returnable container 21 toward the outer sides in the width direction slide over the rails 13.

Further, as shown in FIG. 2, the protrusions 21sa, 21sb are provided with holes 21a, 21b, respectively. As will be described later, the lock mechanism 30 locks the returnable container 21 using these protrusions 21sa, 21sb. While this is not shown, the returnable container 21 can have a lid that can cover up to the protrusions 21sa, 21sb. When providing such a lid, the lid should have holes at positions corresponding to the respective holes 21a, 21b of the protrusions 21sa, 21sb.

Of course, since the returnable container 22 is housed on the rails 13 without being distinguished from the returnable container 21, the returnable container 22 is likewise provided with protrusions in which holes 21a, 21b are provided at the same positions. For convenience, FIG. 2 shows regions 21c, 21d and regions 21e, 21f as other examples of the regions to provide the holes 21a, 21b.

The returnable containers 21, 22 may be provided with a handle for carrying around. This handle for carrying around is different from a drawer handle for using the returnable containers 21, 22 as drawers. Regarding the returnable container 21, this handle can be described as a through-hole that is provided, for example, near the center of each of the protrusions 21sa, 21sb (between the holes 21a, 21b and near the regions 21e, 21f) and large enough to put a hand therein to grasp the returnable container 21.

Figure 3:
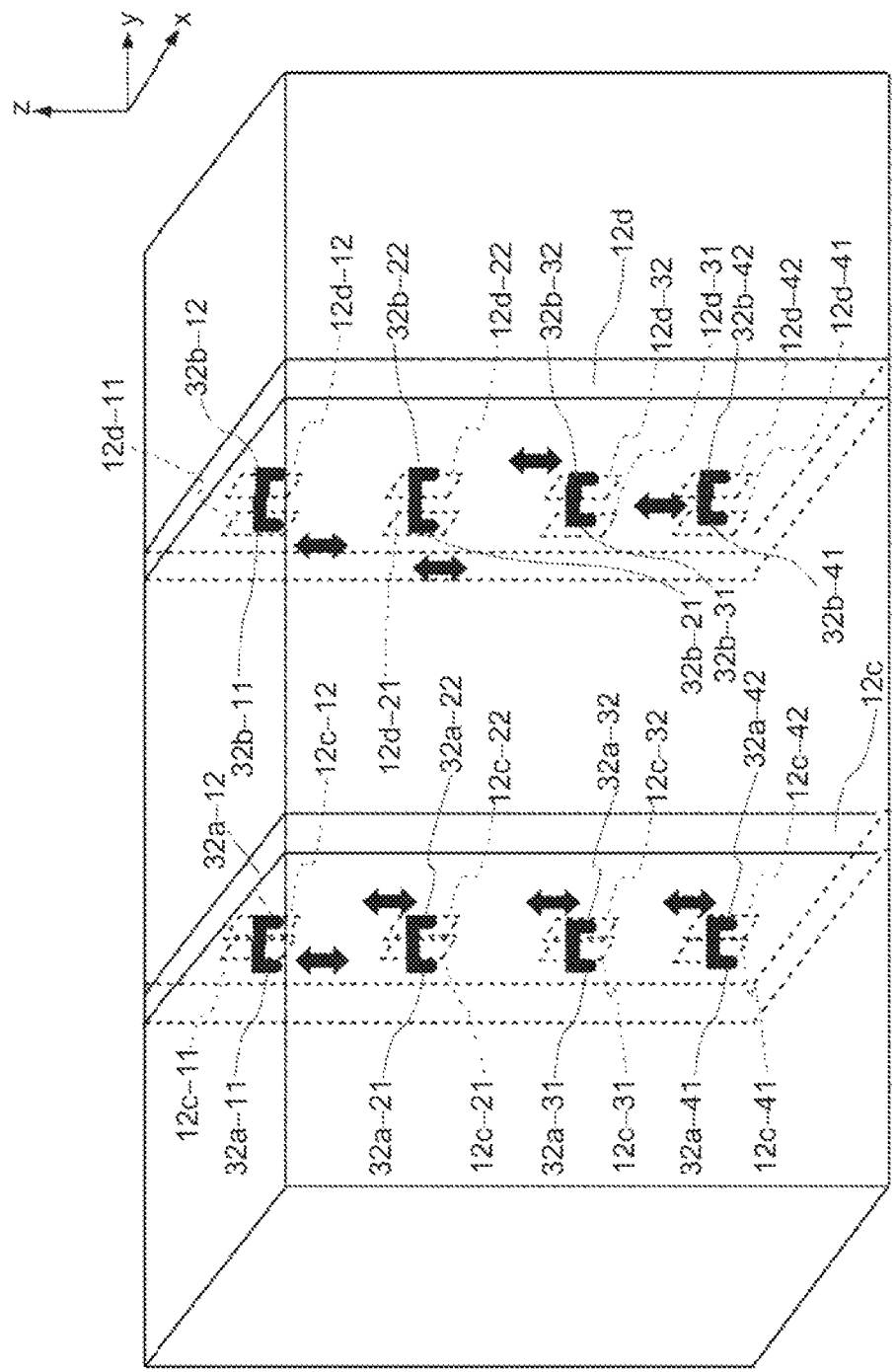
FIG. 3 is a schematic perspective view showing one example of a lock mechanism in the delivery vehicle according to the first embodiment.

Next, details of the lock mechanism 30 will be described with reference to FIG. 3. FIG. 3 is a schematic perspective view showing one example of the lock mechanism 30 in the delivery vehicle 1.

In each of the mechanisms 30a, 30b, i.e., in each of the (N−1) partition plates 12c, 12d, the lock mechanism 30 is provided so as to extend through the partition plate and correspond to each tier, and simultaneously locks two returnable containers that are housed adjacent to each other on one side and the other side of the partition plate. Here, N=3 in this example of the configuration.

For example, the mechanism 30a includes four tiers of lock mechanisms so as to extend through the partition plate 12c. Here, the lock mechanism in the first tier from the top (for convenience, this will be referred to as a lock mechanism 32a-1) has branches 32a-11, 32a-12 for engaging with one of the holes 21a, 21b. Similarly, in the second tier, the third tier, and the fourth tier from the top, a lock mechanism 32a-2 having branches 32a-21, 32a-22, a lock mechanism 32a-3 having branches 32a-31, 32a-32, and a lock mechanism 32a-4 having branches 32a-41, 32a-42 are provided.

To allow the branches 32a-11, 32a-21, 32a-31, 32a-41 to extend through the partition plate 12c in a state of being able to move up and down, openings 12c-11, 12c-21, 12c-31, 12c-41, respectively, are provided on the negative side of the partition plate 12c in the y-axis direction. To allow the branches 32a-12, 32a-22, 32a-32, 32a-42 to extend through the partition plate 12c in a state of being able to move up and down, openings 12c-12, 12c-22, 12c-32, 12c-42, respectively, are provided on the positive side of the partition plate 12c in the y-axis direction. The openings 12c-11, 12c-21, 12c-31, 12c-41 communicate with the openings 12c-12, 12c-22, 12c-32, 12c-42, respectively.

Each of the lock mechanisms 32a-1, 32a-2, 32a-3, 32a-4 can be a solenoid lock having a U-shaped pin that extends through the partition plate 12c so as to straddle the partition plate 12c, and can be configured such that when simultaneously locking two returnable containers that are housed adjacent to each other on one side and the other side of the partition plate 12c, the pin fits into the holes 21a, 21b of the respective two returnable containers. The pin is, for example, the branches illustrated as the branches 32a-11, 32a-12, and may have any shape that has tips to fit into the holes 21a, 21b.

The mechanism 30b similarly includes a lock mechanism 32b-1 having branches 32b-11, 32b-12, a lock mechanism 32b-2 having branches 32b-21, 32b-22, a lock mechanism 32b-3 having branches 32b-31, 32b-32, and a lock mechanism 32b-4 having branches 32b-41, 32b-42 that are provided in the first tier, the second tier, the third tier, and the fourth tier, respectively, from the top.

To allow the branches 32b-11, 32b-21, 32b-31, 32b-41 to extend through the partition plate 12d in a state of being able to move up and down, openings 12d-11, 12d-21, 12d-31, 12d-41, respectively, are provided on the negative side of the partition plate 12d in the y-axis direction. To allow the branches 32b-12, 32b-22, 32b-32, 32b-42 to extend through the partition plate 12d in a state of being able to move up and down, openings 12d-12, 12d-22, 12d-32, 12d-42, respectively, are provided on the positive side of the partition plate 12d in the y-axis direction. The openings 12d-11, 12d-21, 12d-31, 12d-41 communicate with the openings 12d-12, 12d-22, 12d-32, 12d-42, respectively.

Each of the lock mechanisms 32b-1, 32b-2, 32b-3, 32b-4 can be a solenoid lock having a U-shaped pin that extends through the partition plate 12d so as to straddle the partition plate 12d, and can be configured such that when simultaneously locking two returnable containers that are housed adjacent to each other on one side and the other side of the partition plate 12d, the pin fits into the holes 21a, 21b of the respective two returnable containers. The pin is, for example, the branches illustrated as the branches 32b-11, 32b-12, and may have any shape that has tips to fit into the holes 21a, 21b.

In this configuration, the returnable container 21 can be locked by using the protrusions 21sa, 21sb thereof, and the number of driving sources (actuators or the like) can be reduced to thereby keep the manufacturing cost down.

Figure 4:
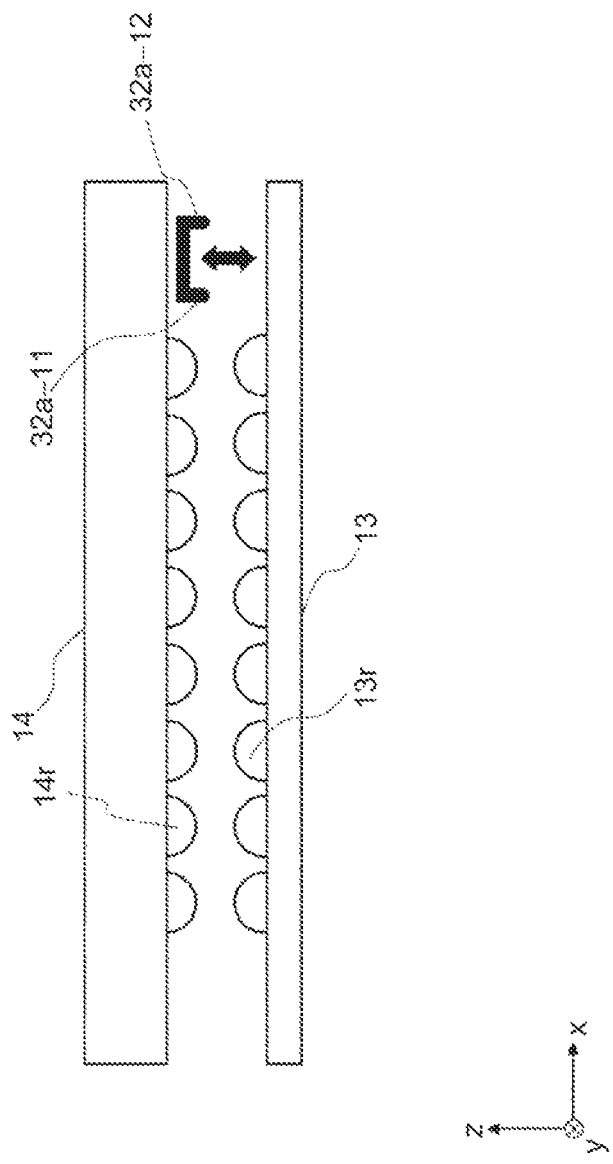
FIG. 4 is a schematic side view showing one example of a rail and the lock mechanism in the delivery vehicle according to the first embodiment.
Figure 5:
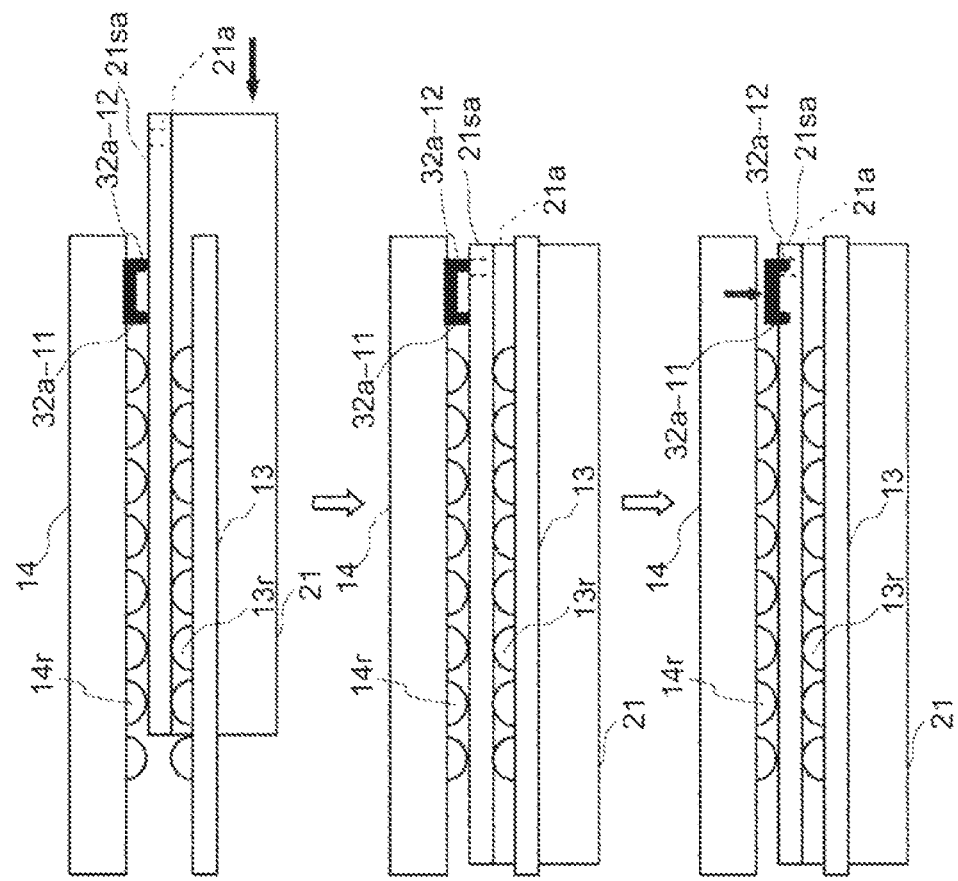
FIG. 5 is a schematic side view showing one example of the rail and the lock mechanism in the delivery vehicle according to the first embodiment.

Next, an example of the structures of the rail 13 and the auxiliary part 14 and how to house the returnable container 21 and lock it by the lock mechanism 30 will be described with reference to FIG. 4 and FIG. 5. FIG. 4 and FIG. 5 are schematic side views showing one example of the rail 13 and the lock mechanism 30 in the delivery vehicle 1. In FIG. 4 and FIG. 5, only the rail 13 and the auxiliary part 14 in the top tier are shown while other parts are omitted.

As shown in FIG. 4, the rail 13 is a roller rail and includes a plurality of rollers 13r. The rollers 13r are made of plastic, for example. The rollers 13r can reduce the coefficient of friction between a lower surface of the protrusion 21sa of the returnable container 21 and the rail 13, as well as can mitigate generation of abrasion dust resulting from sliding of the protrusion 21sa.

As shown in FIG. 5, the auxiliary part 14 is a part that presses the protrusion 21sa so as to be held between the rail 13 and the auxiliary part 14. The auxiliary part 14 can be a roller rail like the rail 13 and include a plurality of rollers 14r that are made of plastic, for example. The rollers 14r can reduce the coefficient of friction between an upper surface of the protrusion 21sa of the returnable container 21 and the auxiliary part 14, as well as can mitigate generation of abrasion dust resulting from sliding of the protrusion 21sa. When the returnable container 21 is housed, the protrusion 21sb, like the protrusion 21sa, is also held between the rail 13 and the auxiliary part 14.

As shown in FIG. 5, the lock mechanism 32a-1 having the branches 32a-11, 32a-12 is disposed in such a state as to be able to move up and down. The branches 32a-11, 32a-12 have L-shapes that are bent (extended) downward and combined into a U-shape. Thus, for example, lowering the lock mechanism 32a-1 as a whole causes the branch 32a-12 and the hole 21a of the returnable container 21 to engage with each other, and the branch 32a-11 and the hole 21b of the adjacent returnable container to engage with each other in that returnable container, and raising the lock mechanism 32a-1 dissolves the engagement between these branches and holes.

For convenience, FIG. 4 and FIG. 5 that are side views show the two branches 32a-11, 32a-12 of the lock mechanism at different positions in the x-axis direction, but in reality these positions coincide with each other. Thus, in the state at the bottom of FIG. 5, the branch 32a-11 engages with the hole 21b of the adjacent returnable container that is located on the negative side in the y-axis direction of the returnable container 21 of FIG. 5.

The holes 21a, 21b can be through-holes but may instead be blind holes. In other words, the branch 32a-11 etc. are shaped to engage in the holes 21a, 21b. These branches may be engaged by, for example, being loosely inserted.

While only the engagement between the hole 21a and the branch 32a-12 has been described above with reference to FIG. 4 and FIG. 5, engagement of the other returnable containers in the other tiers of the other rows is the same. As illustrated in FIG. 2, FIG. 4, and FIG. 5, the holes 21a, 21b may be provided at ends of the protrusions 21sa, 21sb in a longitudinal direction (more preferably, at ends in the depth direction). This configuration allows the returnable container 21 to be locked in a state of having been slid to a fixed position, which can mitigate the concern that the returnable container 21 may be locked in a state of having been slid halfway.

Alternatively, a lock mechanism may be adopted in which the branch 32a-11 etc. have an I-shape (e.g., such a shape that the branches 32a-11 and 32a-12 are located on a straight line), instead of an L-shape, and are inserted in the width direction of the casing 11 into holes (recesses) formed by columnar spaces (columnar spaces with a semicircular cross-section) provided in side surfaces of the protrusions 21sa, 21sb. In this case, the thicknesses of the protrusions 21sa, 21sb are increased to form the recesses.

The procedure of locking the returnable container 21 when the returnable container 21 is inserted into the casing 11 will be described. First, the returnable container 21 that is not yet inserted as shown in FIG. 4 is inserted while being slid over the rails 13 as shown at the top of FIG. 5. The returnable container 21 is slid over the rails 13 with the lock thereon released as shown at the top and the center of FIG. 5. Therefore, before the start of insertion and during insertion, each of the branches 32a-11, 32a-12 have been retracted upward.

In a state where the returnable container 21 is stopped at a predetermined position (housed position) on the rails 13 as shown at the center of FIG. 5, activating the lock mechanism 30 can lock the returnable container 21 as shown at the bottom of FIG. 5. Specifically, the returnable container 21 is fixed to the casing 11 as the branch 32a-12 moves downward from the state at the center of FIG. 5 and engages in the hole 21a provided in the protrusion 21sa of the returnable container 21. If a lid (not shown) is provided on the returnable container 21, the lid of the returnable container 21 is locked at the same time as the branch 32a-12 engages. Of course, when the lock mechanism 30 for the returnable container 21 is released, the returnable container 21 becomes movable again as shown at the top of FIG. 5.

As has been described above, in this embodiment, each of the N rows divided by the (N−1) partition plates is provided with the door that allows the row to be separately opened and closed (i.e., allows the row to be separately switched between a state of permitting putting in and out and a state of prohibiting it). A total of {(N−1)×M} lock mechanisms are each provided in one of the (N−1) partition plates so as to extend through the partition plate and correspond to one tier, and each simultaneously lock two returnable containers that are housed adjacent to each other on one side and the other side of the partition plate. Thus, this lock mechanism can reduce the number of parts to be activated by M from that of a lock mechanism in which each of (M×N) pairs of supports is activated, so that the manufacturing cost of the rack can be kept down.

For example, when only one of the doors 41 to 43 that corresponds to a row from which a returnable container is to be taken out is opened (a state where only the door of a row among the left row 51, the center row 52, and the right row 53 from which the returnable container is to be taken out is opened), and the lock mechanism that locks the target returnable container is unlocked, only that returnable container can be taken out. In this embodiment, the example of three rows can be said to be most effective in reducing the manufacturing cost. To give further details, as can be seen from the configuration of FIG. 3, for example, the returnable container in the center row 52 can be taken out by opening the door of the center row 52 and unlocking both the lock mechanisms on both sides thereof (e.g., in the case of the topmost tier, the lock mechanisms 32a-1, 32b-1). On the other hand, the returnable container in the center row 52 can be prevented from being taken out by closing the door of the center row 52 and/or locking at least one of the lock mechanisms on both sides thereof (e.g., in the case of the topmost tier, at least one of the lock mechanisms 32a-1, 32b-1).

While it is preferable in terms of management and delivery operation that the interval B at which the rails (supports) 13 are disposed be equal among the rows, the interval B may also be varied among the rows. The widths of the rows (distances in the y-axis direction) may be varied, but making the widths equal allows for efficient delivery.

The embodiment has been described based on the assumption that the rack 10 can house all the returnable containers (e.g., the returnable containers 21, 22) of two or more prespecified sizes. Of course, even when the rack 10 is a rack that can house returnable containers of one prespecified size, delivery using these returnable containers of one size can be streamlined and the same effects of the lock mechanism can be achieved. While this is not shown, when a rack that can house returnable containers of one prespecified size is adopted, M pairs of rails (supports) 13 are arrayed at regular intervals in the height direction (z-axis direction) in each row as in the embodiment, and this regular interval is set to be nearly equal to the height of the returnable containers of one size.

While the embodiment has been described based on the assumption that each part of the lock mechanism 30 (the lock mechanism 32a-1 etc.) is electrically driven by the driving source, the embodiment can also adopt a lock mechanism that manually locks and unlocks without having a driving source. For example, the lock mechanism 32a-1 etc. may each be a mechanism that is mechanically and manually activated. Thus, the lock mechanism 32a-1 etc. are not limited to mechanisms including a solenoid lock, and may be any mechanism that can restrict the motion of the returnable containers including the returnable container 21 and lock the returnable containers.

In the embodiment, also when such a configuration of manually locking and unlocking the returnable containers is adopted, providing at most as many operating parts as the number of the lock mechanisms 32a-1 etc. for a plurality of objects to be locked suffices, so that the manufacturing cost can be kept down. Moreover, in this case, the operating parts for locking and unlocking the returnable containers can be collected in a common region, which has the advantage of facilitating the operation.

The delivery vehicle 1 can be, for example, an autonomous (driverless) vehicle. The depth direction of the rack 10 in the delivery vehicle 1 corresponds to the left-right direction or the front-rear direction of the vehicle. When the vehicle is not an autonomous vehicle, since the driver's seat is commonly disposed on the front side, the inner side in the depth direction is the side of the driver's seat in the left-right direction.

If the delivery vehicle 1 is an autonomous vehicle, delivery costs can be reduced. For example, the delivery vehicle 1 can travel on sidewalks and the like, let alone roads, and can deliver the returnable containers 21, 22 to the vicinity of a place where they are unloaded or a place where they are transferred. When the vehicle becomes unable to travel autonomously, for example, the delivery vehicle 1 may be remotely operated. A delivery person may drive the delivery vehicle 1, and may carry the articles (i.e., the returnable containers 21, 22) to a place where the articles are transferred from the delivery vehicle 1 and transfer them. The place to which the returnable containers 21, 22 are transferred may be, for example, a rack similar to the rack 10.

It is also possible to house articles in the returnable containers 21, 22 with, for example, an order identification information id attached thereto, and deliver the articles in this state. The order identification information id attached to the returnable containers 21, 22 is, for example, a character, symbol, barcode, two-dimensional code, or radio frequency identifier (FRID). For example, a reader (not shown) that can read the order identification information id attached to the returnable containers 21, 22 can be provided in the rack 10 of the delivery vehicle 1 or at other part of the delivery vehicle 1. Thus, the control unit of the delivery vehicle 1 can also perform control such that the lock on a returnable container to be unloaded is released by specifying the order identification information id.

Second Embodiment

Figure 6:
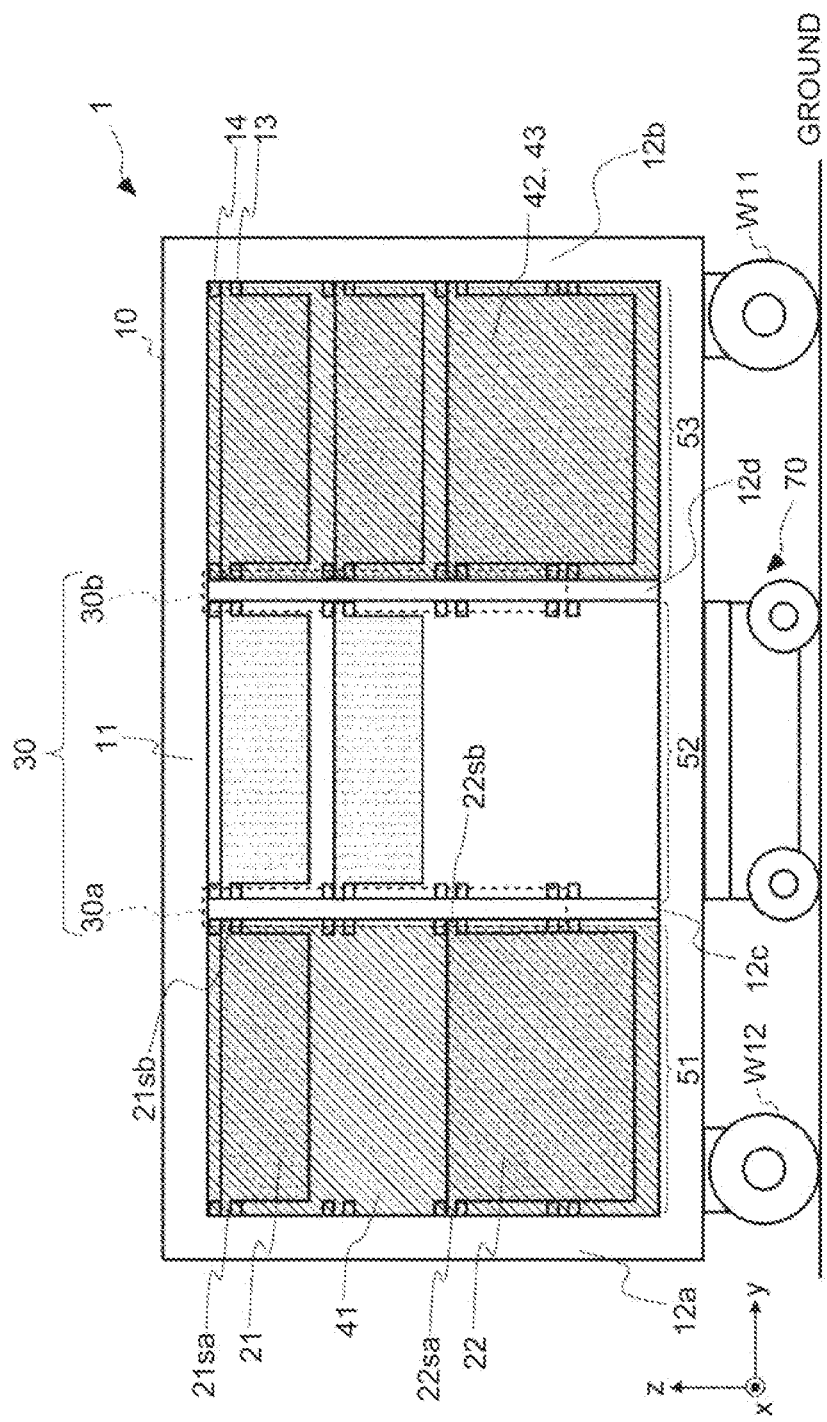
FIG. 6 is a schematic side view of a delivery vehicle according to a second embodiment.

Next, a delivery vehicle according to a second embodiment will be described with reference to FIG. 6 and FIG. 7. FIG. 6 is a schematic side view of the delivery vehicle according to the second embodiment, and FIG. 7 is a schematic side view of a transfer robot.

As shown in FIG. 6, in this embodiment, while the delivery vehicle 1 delivers the returnable containers 21, 22, a transfer robot 70 may be housed under the delivery vehicle 1 and mechanically or electromagnetically coupled thereto. The transfer robot 70 is an autonomous vehicle that, after the delivery vehicle 1 arrives in the vicinity of a delivery rack similar to the rack 10, transfers the returnable containers 21, 22 (i.e., the articles) from the delivery vehicle 1 to that delivery rack. If the lock mechanism 30 is electrically controllable and the doors 41 to 43 are openable and closable, each returnable container can be easily locked and unlocked at the time of loading and unloading for transfer.

Figure 7:
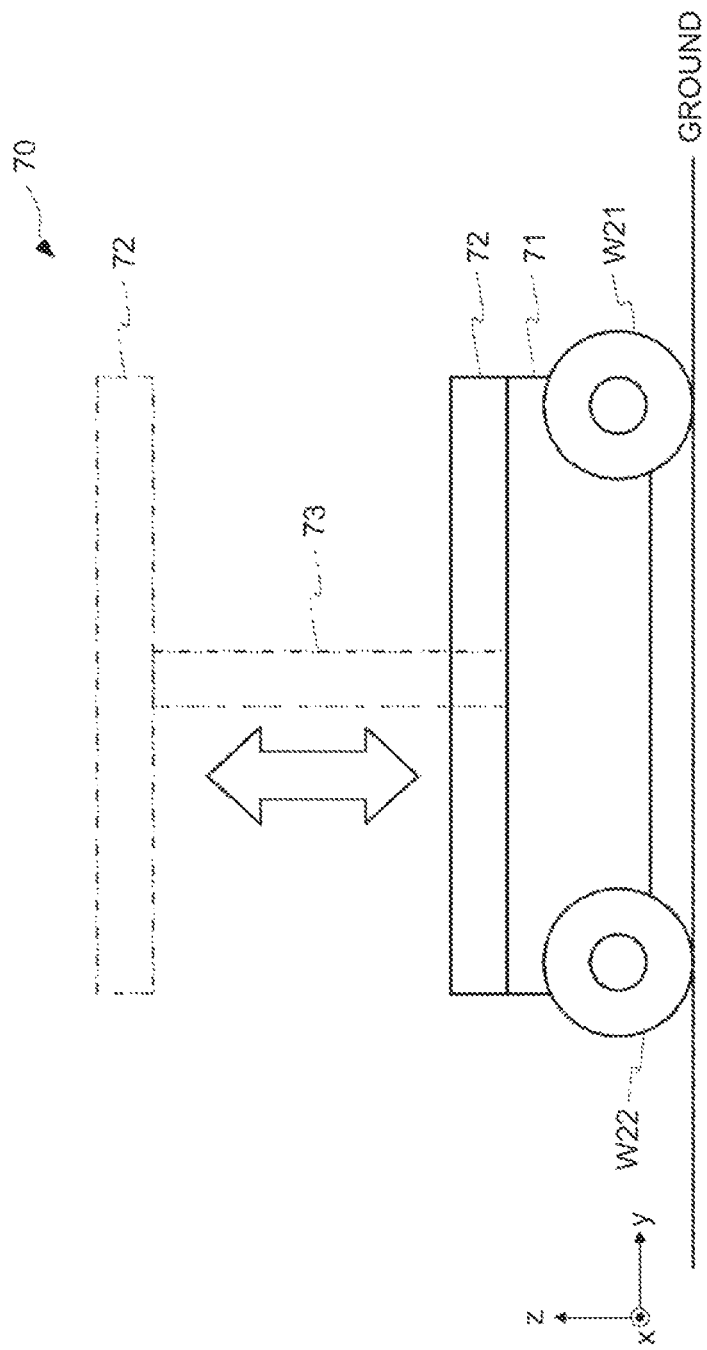
FIG. 7 is a schematic side view of a transfer robot.

As shown in FIG. 7, the transfer robot 70 includes wheels W21, W22, a main body 71, a top plate 72, and a pillar 73. The two pairs of wheels W21, W22 are rotatably fixed under the main body 71 and driven by a driving source (not shown), such as a motor.

As shown in FIG. 7, the top plate 72 is coupled to the main body 71 through an extendable-contractable pillar 73. The top plate 72 is coupled at an upper end of the pillar 73, and the transfer robot 70 transfers the returnable containers 21, 22 with the returnable containers 21, 22 placed on the top plate 72. The pillar 73 has, for example, a telescopic extending-contracting mechanism and is extended and contracted by a driving source (not shown), such as a motor. As indicated by the outlined arrow in FIG. 7, changing the length of the pillar 73 can change the level of the top plate 72. Therefore, the returnable containers 21, 22 can be transferred from any housing place in the delivery vehicle 1 to any housing place in the delivery rack.

Here, the transfer robot 70 includes a manipulator (not shown), for example, and using the manipulator, moves the returnable containers 21, 22 from the delivery vehicle 1 to the top plate 72 and thus transfers them. Then, using the manipulator, the transfer robot 70 moves the returnable containers 21, 22 from the top plate 72 to the delivery rack.

In the configuration shown in FIG. 6, the transfer robot 70 may serve as a power source to move the delivery vehicle 1. This means that the delivery vehicle 1 need not have a driving source for driving the wheels W11, W12. In this case, a plurality of (e.g., two) transfer robots 70 may be provided side by side in the y-axis direction to move the delivery vehicle 1. The transfer robot 70 may be mounted on the delivery vehicle 1 or travel alongside the delivery vehicle 1.

The configuration of the second embodiment is otherwise the same as that of the first embodiment and therefore will not be further described. The various application examples described in the first embodiment are applicable also in this embodiment.

Third Embodiment

Figure 8:
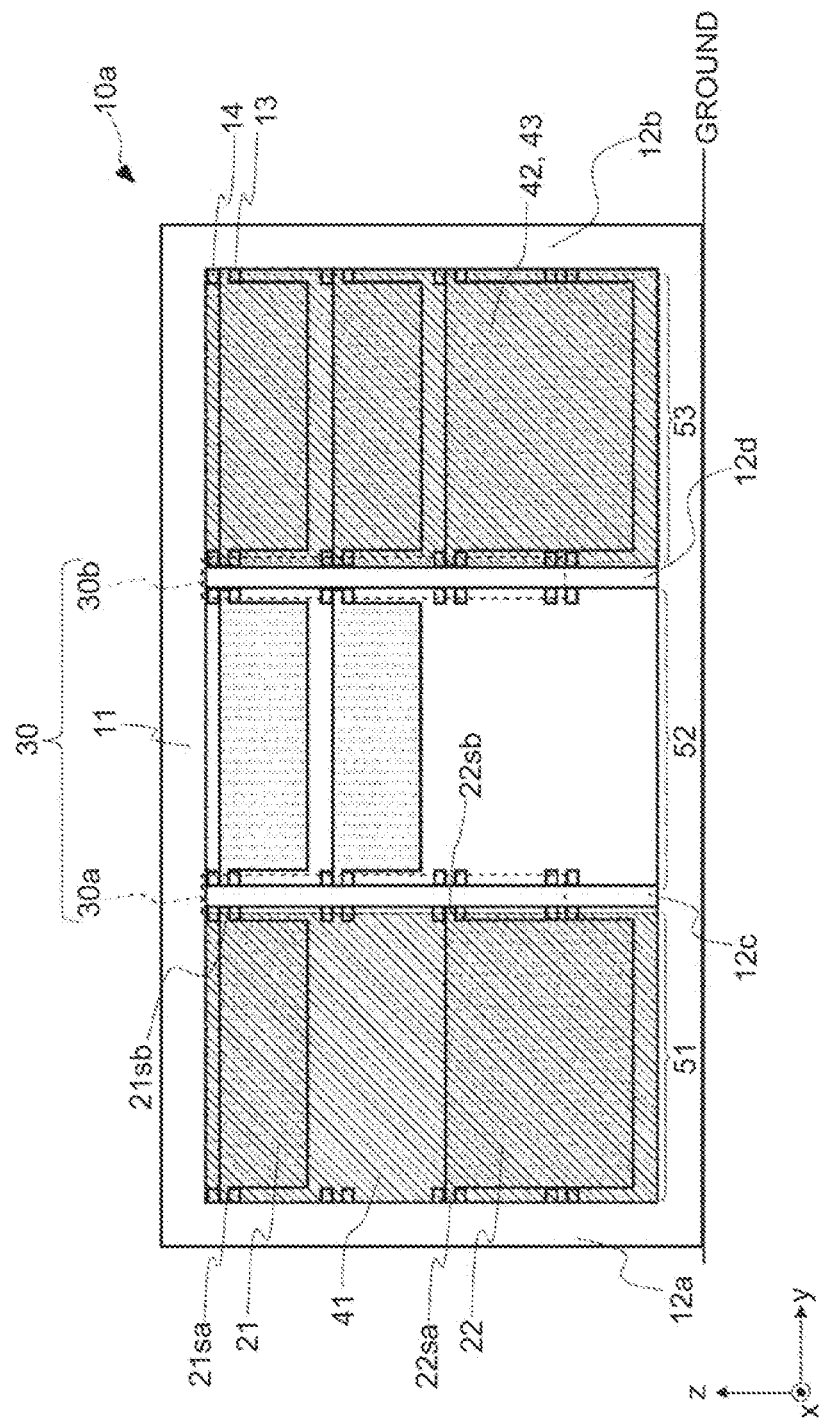
FIG. 8 is a schematic side view showing one example of a delivery rack according to a third embodiment.

FIG. 8 is a schematic side view showing one example of a delivery rack according to a third embodiment. As shown in FIG. 8, a delivery rack 10a according to this embodiment can adopt the same configuration as the rack 10 mounted on the delivery vehicle 1 of FIG. 1 and FIG. 6. While this will not be described in detail, the delivery rack 10a can include a casing 11, partition plates 12c, 12d, rails 13, auxiliary parts 14, and a lock mechanism 30.

The delivery rack 10a according to this embodiment can be installed as a place to which the returnable containers 21, 22 are moved from the delivery vehicle 1, or can be installed as a rack in which the returnable containers 21, 22 to be delivered by the delivery vehicle 1 are stored beforehand. Thus, the delivery rack 10a can be used as a receiving place and a sending place in delivering articles using the returnable containers 21, 22. In the delivery rack 10a, the returnable containers 21, 22 that have become empty after the articles have been taken out can be collected as appropriate by the delivery vehicle 1.

The delivery rack 10a can also be provided outdoors. As an example of outdoor usage, the delivery rack 10a may be installed in the entrance or a corridor of an apartment complex. Further, the delivery rack 10a may be installed in a house, and may be provided indoors. The term "house" here covers an apartment complex, an office building, etc.

The delivery rack 10a may be provided so as to extend through an outer wall of a house. This configuration makes it possible to carry the delivered returnable containers 21, 22 into the delivery rack 10a from outdoors, and to take the returnable containers 21, 22 out of the delivery rack 10a on an inside of a residential space. The term "residential space" here covers an office space. In this case, for example, an outer door and an inner door (not shown) that can be opened and closed may be provided on an outdoor side and an indoor side of the delivery rack 10a, and an interlock mechanism that prevents the outer door and the inner door from opening at the same time may be provided. This can protect the privacy of people living in the house.

In addition, the various application examples described in the first and second embodiments are applicable also to the delivery rack according to this embodiment.

Others

In the above examples, the various control programs can be stored using various types of non-transitory computer-readable media and supplied to a computer. Non-transitory computer-readable media include various types of tangible storage media. Examples of non-transitory computer-readable media include a magnetic recording medium (e.g., a flexible disc, magnetic tape, and hard disk drive), a magneto-optical recording medium (e.g., a magneto-optical disk), a CD-ROM, a CD-R, a CD-R/W, and a semiconductor memory (e.g., a mask ROM, programmable ROM (PROM), erasable PROM (EPROM), flash ROM, and RAM). Alternatively, the programs may be supplied to a computer by various types of transitory computer-readable media. Examples of transitory computer-readable media include electric signals, optical signals, and electromagnetic waves. Transitory computer-readable media can supply the programs to a computer through a wire communication channel, such as a wire or an optical fiber, or a wireless communication channel.

The present disclosure is not limited to the above-described embodiments but can be changed as appropriate within a range that does not depart from the gist of the disclosure. For example, the height of the returnable container to be housed is not limited to being nearly a multiple of the interval B, if streamlining of delivery is not pursued and housing the returnable containers so as to be spaced apart in the height direction is tolerated. In the example where four pairs of rails 13 are provided in each row as in FIG. 1, returnable containers of which the heights are, for example, 0.5, 1.5, 2.7, or 3.9 times the interval B can also be housed.

What is claimed is:

1. A delivery rack comprising:
a casing;
a plurality of returnable containers;
M pairs of supports, with M being an integer not less than two, that are provided inside the casing so as to extend in a depth direction and arrayed in M tiers at regular intervals in an up-down direction; and
a lock mechanism that locks the returnable containers housed while being supported so as to be slidable along the respective M pairs of supports,
the delivery rack being able to house all the returnable containers of one or more prespecified sizes, wherein:
the casing is divided into N rows by (N−1) partition plates, with the M pairs of supports provided in each of the N rows, and the delivery rack is able to house a maximum of (M×N) returnable containers;
each of the N rows is provided with a door that allows the row to be separately opened and closed;
the lock mechanism is provided in each of the (N−1) partition plates so as to extend through the partition plate and correspond to each tier; and
the lock mechanism simultaneously locks two returnable containers that are housed adjacent to each other on one side and the other side of the partition plate.

2. The delivery rack according to claim 1, wherein:
a protrusion that protrudes from the returnable container toward an outer side in a width direction slides over the supports;
the lock mechanism is a solenoid lock having a U-shaped pin that extends through the partition plate so as to straddle the partition plate; and
when simultaneously locking two returnable containers that are housed adjacent to each other on one side and the other side of the partition plate, the pin fits into holes that are provided in the protrusions of the respective two returnable containers.

3. A delivery vehicle comprising a rack, wherein:
the rack has:
a casing;
a plurality of returnable containers;
M pairs of supports, with M being an integer not less than two, that are provided inside the casing so as to extend in a depth direction and arrayed in M tiers at regular intervals in an up-down direction; and
a lock mechanism that locks the returnable containers housed while being supported so as to be slidable along the respective M pairs of supports;
the rack is able to house all the returnable containers of one or more prespecified sizes;
the casing is divided into N rows by (N−1) partition plates, with the M pairs of supports provided in each of the N rows, and the rack is able to house a maximum of (M×N) returnable containers;
each of the N rows is provided with a door that allows the row to be separately opened and closed;
the lock mechanism is provided in each of the (N−1) partition plates so as to extend through the partition plate and correspond to each tier; and
the lock mechanism simultaneously locks two returnable containers that are housed adjacent to each other on one side and the other side of the partition plate.

4. The delivery vehicle according to claim 3, wherein:
a protrusion that protrudes from the returnable container toward an outer side in a width direction slides over the supports;
the lock mechanism is a solenoid lock having a U-shaped pin that extends through the partition plate so as to straddle the partition plate; and
when simultaneously locking two returnable containers that are housed adjacent to each other on one side and the other side of the partition plate, the pin fits into holes that are provided in the protrusions of the respective two returnable containers.

5. The delivery vehicle according to claim 3, wherein the delivery vehicle is an autonomous vehicle.

* * * * *